H. G. JOHNSTON.
GUIDE FOR DRIVE CHAINS.
APPLICATION FILED AUG. 2, 1920.

1,378,795.

Patented May 17, 1921.

Inventor
Horace G. Johnston
By Mason, Fenwick & Lawrence
Attorneys

UNITED STATES PATENT OFFICE.

HORACE G. JOHNSTON, OF CORSICANA, TEXAS, ASSIGNOR TO GENEVIEVE JOHNSTON, OF CORSICANA, TEXAS.

GUIDE FOR DRIVE-CHAINS.

1,378,795.  Specification of Letters Patent.  Patented May 17, 1921.

Application filed August 2, 1920. Serial No. 400,805.

*To all whom it may concern:*

Be it known that I, HORACE G. JOHNSTON, citizen of the United States, residing at Corsicana, in the county of Navarro and State of Texas, have invented certain new and useful Improvements in Guides for Drive-Chains; and I do hereby declare the following to be a full, clear, and exact description of the invention, such as will enable others skilled in the art to which it appertains to make and use the same.

This invention relates to guides and supports therefor, adapted to prevent a drive chain or similar endless flexible driving element from becoming displaced from the sprocket or other drive or driven wheels.

The purpose of the invention is to prevent a drive chain or the like subject to heavy duty, from being displaced from the wheels, and to provide a strong and readily adjustable guide to accomplish this purpose.

The invention consists in the particular structure described in the following specification, illustrated in the drawings and defined in the appended claims.

Figure 1:
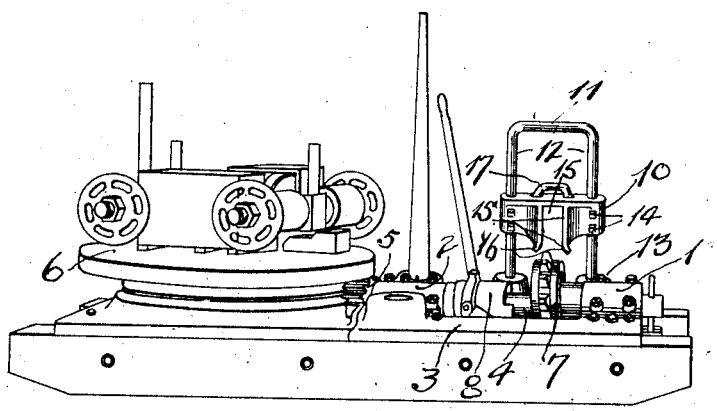
Figure 1 is a perspective view of a rotary showing the improved guide in position.
Figure 2:
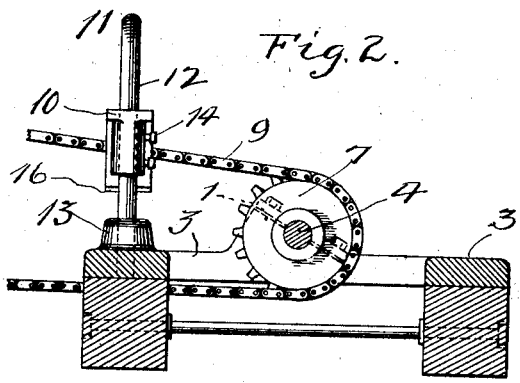
Fig. 2 is a section across the main drive shaft showing the guide and its support in edge elevation.

The rotary illustrated in Fig. 1 is of the general type shown in my Patent No. 959,351, May 24th, 1910, and No. 1,135,808, April 13th, 1915. The particular improvement which forms the subject of this application is the means for driving the guide chain, or other endless driving band, which transmits movement from a prime mover or prime power shaft to the prime power receiving shaft of the rotary drill operating mechanism.

In the illustrated embodiment of my improvement there is suitably journaled in bearings 1 and 2, on the bed plate or base casting 3, a prime power receiving shaft 4, carrying a pinion 5 in mesh with a bevel gear on the rotary plate 6. Rotatably or loosely mounted on the shaft 4 between the bearings 1 and 2 is a sprocket wheel 7. A clutch 8, adapted to interengage with a similar clutch member secured to the wheel 7, is splined to the shaft 4 between the wheel 7 and the bearing 2.

The wheel 7 is the power receiving wheel of the rotary. In the construction shown wheel 7 is driven from a source of power by a sprocket chain 9. In order to retain the chain in correct position and keep it from slatting, or throwing off from the wheel 7, by reason of any shocks to which it may be subjected, a chain guide member 10 is adjustably mounted on an inverted U-shaped support 11, the latter having the ends of the limbs 12 fitted firmly in sockets 13 formed in the base casting 3 adjacent one edge, as shown. The U-shaped support 11 may be secured in place by set screws, or otherwise, so that it may be removed from its position. The guide member 10 may be a relatively heavy, strong casting having corresponding parallel holes bored through each end, respectively, sleeved over the limbs 12 of the U-shaped support. Set screws 14 are preferably tapped into the ends of the guide member, penetrating laterally into the openings embracing the limbs 12, so that said chain guide 10 may be adjusted and fixed in any desired position on the limbs 12 of said support 11. A vertical notch or opening 15 is formed in the under side of the member 10 of a width suitable to embrace the guide chain 8 easily and provide side guiding elements 15ª to prevent it from moving sidewise. The lower end of the guide notch 15 flares outward, the guiding elements diverging as indicated at 16, for the purpose of enabling the guide to be pushed down over the chain without danger of corners catching thereon. A handle 17 is located on the guide member 10 midway between the limbs 11 whereby the positions of said guide 10 may be readily and symmetrically adjusted, or the said guide may be lifted out of the way, if desired, by the use of one hand.

This guide is of particular utility in a rotary well drilling apparatus, and, as shown, is adapted to accommodate itself or be adjusted to the different positions that may be assumed by the upper ply of the drive chain owing to different positions which may be taken by the prime mover shaft or to the different inclinations that may be assumed by the upper ply of the chain by which the rotary is to be driven.

Having described my invention in such manner as to enable those skilled in the art to make and use the same, what I claim and desire to secure in Letters Patent is:

1. In a driving mechanism for well drilling rotaries, a base, a driving mechanism thereon comprising a wheel, a flexible driving element engaging the wheel, a guide member adjacent said wheel embracing the edges of said flexible driving element, a support for the guiding member rigidly mounted on said base and extending upward therefrom, and means adapting the guide member to be adjusted along said support and be secured in adjusted position.

2. In a driving mechanism for well drilling rotaries, a base, driving gear thereon comprising a wheel, a flexible driving element engaging said wheel, a pair of upright supporting limbs rigidly mounted on said base adjacent the wheel and on opposite sides of one ply of the flexible driving element, a guide member bridged between and connecting said supporting limbs in such manner as to resist forces tending to separate them, said guide member having spaced guiding elements embracing the edges of one ply of the flexible driving element.

3. In a driving mechanism for well drilling rotaries, a base, driving gear thereon comprising a wheel, a flexible driving element engaging said wheel, a pair of upright supporting limbs rigidly mounted on the base adjacent the wheel on opposite sides of one ply of the flexible driving element, a guide member bridged between and connecting said supporting members and adjustable thereon, said guide member having spaced guiding elements adapted to embrace the edges of one ply of said flexible driving element, and means to secure the guide member in adjusted position on the supporting limbs.

4. A guiding means for a flexible driving element, comprising a U-shaped support disposed astride said flexible driving element, a guide member having openings in its ends embracing the limbs of said U-shaped support and adjustable longitudinally thereof, said guide member having spaced guiding elements adapted to embrace said flexible driving element.

5. A guiding means for a flexible driving element comprising a pair of supporting limbs between which the driving element extends, a guide member bridged across said limbs, and adapted to be moved therein, said guide member having a notch adapted to fit over the flexible driving element, and a handle on said guide member disposed above the notch.

6. A guiding means for a flexible driving element comprising a U-shaped support disposed astride said flexible driving element, a guide member bridged across the limbs of said U-shaped support and adjustable thereon, said guide member having a notch adapted to fit over the flexible driving element, and a handle on said guiding member disposed over the notch.

In testimony whereof I affix my signature.

HORACE G. JOHNSTON.